United States Patent
Cho et al.

(10) Patent No.: US 8,488,620 B2
(45) Date of Patent: Jul. 16, 2013

(54) METHOD AND APPARATUS FOR TRANSMITTING/RECEIVING RACH

(75) Inventors: Yun-Ok Cho, Suwon-si (KR); Seung-Hoon Park, Seoul (KR); Kyeong-In Jeong, Hwaseong-si (KR); Ju-Ho Lee, Suwon-si (KR); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1027 days.

(21) Appl. No.: 11/841,337

(22) Filed: Aug. 20, 2007

(65) Prior Publication Data

US 2008/0043771 A1 Feb. 21, 2008

(30) Foreign Application Priority Data

Aug. 18, 2006 (KR) .................. 10-2006-0078412

(51) Int. Cl.
*H04L 12/413* (2006.01)
(52) U.S. Cl.
USPC ..................... 370/447; 370/462; 455/450
(58) Field of Classification Search
USPC ............. 370/431, 230, 230.1, 231, 235, 389, 370/392, 437, 441–445, 447, 450, 461–462, 370/465; 455/450, 452.1, 452.2, 453–454, 455/507, 509, 515–517
See application file for complete search history.

(56) References Cited

U.S. PATENT DOCUMENTS

| | | | | |
|---|---|---|---|---|
| 5,910,851 A * | 6/1999 | Flaherty | ........................ | 359/110 |
| 6,130,894 A * | 10/2000 | Ojard et al. | ................... | 370/421 |
| 6,795,412 B1 * | 9/2004 | Lee | ............................... | 370/329 |
| 6,859,445 B1 * | 2/2005 | Moon et al. | ................... | 370/335 |
| 6,954,452 B2 | 10/2005 | Moulsley et al. | | |
| 7,002,984 B1 * | 2/2006 | Cheng | ........................... | 370/437 |
| 7,164,918 B2 * | 1/2007 | Moulsley et al. | ............ | 455/450 |
| 7,733,897 B2 * | 6/2010 | Ko et al. | ........................ | 370/447 |
| 7,764,686 B1 * | 7/2010 | Toebes et al. | ................. | 370/392 |
| 8,228,846 B2 * | 7/2012 | Kato et al. | .................... | 370/328 |

(Continued)

FOREIGN PATENT DOCUMENTS

| | | |
|---|---|---|
| DE | 101 13 034 | 9/2002 |
| KR | 1020070080544 | 8/2007 |
| WO | WO 01/01641 | 1/2001 |

OTHER PUBLICATIONS

Ivan N. Vukovic, "Throughput Comparison of Random Access Schemes in 3GPP", Motorola Inc., IEEE., 2003.

*Primary Examiner* — Chi Pham
*Assistant Examiner* — Kevin Mew
(74) *Attorney, Agent, or Firm* — The Farrell Law Firm, P.C.

(57) ABSTRACT

A method and apparatus for transmitting/receiving a Random Access Channel (RACH) signal in a communication system. A User Equipment (UE) selects one of Contention Resolution (CR) channels allocated for collision detection, and transmits the selected CR channel and a connection request message to an Evolved Node B (E-NB), and receives a response signal from the E-NB. The UE transmits the RACH signal, if a collision indicator is included in the response signal. The E-NB receives from each of UEs a connection request message and a CR channel, decodes the connection request message, and detects a collision between the UEs using the CR channel. The E-NB generates a response signal to the connection request message according to the decoding result, generates a collision indicator according to the collision detection result, and transmits to the UEs at least one of the generated response signal, the generated collision indicator, and a unique ID of a corresponding UE.

13 Claims, 13 Drawing Sheets

U.S. PATENT DOCUMENTS

| | | | |
|---|---|---|---|
| 8,228,939 B1 * | 7/2012 | Moulsley et al. | 370/462 |
| 2001/0012301 A1 * | 8/2001 | Yi et al. | 370/439 |
| 2003/0174672 A1 * | 9/2003 | Herrmann | 370/329 |
| 2003/0223452 A1 * | 12/2003 | Toskala et al. | 370/442 |
| 2005/0068979 A1 * | 3/2005 | Boer et al. | 370/445 |
| 2008/0273503 A1 | 11/2008 | Lee et al. | |

* cited by examiner

METHOD AND APPARATUS FOR TRANSMITTING/RECEIVING RACH

PRIORITY

This application claims priority under 35 U.S.C. §119(a) to a Korean Patent Application filed in the Korean Intellectual Property Office on Aug. 18, 2006 and assigned Serial No. 2006-78412, the disclosure of which is incorporated herein by reference.

BACKGROUND OF THE INVENTION

1. Field of the Invention

The present invention relates generally to a method and apparatus for transmitting/receiving a Random Access CHannel (RACH) in a communication system, and in particular, to a method and apparatus for transmitting/receiving a Contention Resolution (CR) channel in RACH transmission.

2. Description of the Related Art

RACH is a channel that terminals, or User Equipments (UEs), having no dedicated channel, use to transmit uplink data. The UEs that do not have a dedicated channel are represented by UEs in Cell_FACH, Cell_PCH, URA_PCH or Idle mode in Universal Mobile Telecommunications System (UMTS). Physical RACH (PRACH) can be defined as a set of wireless resources used for RACH transmission. The wireless resources of a PRACH are composed of the following:

1. Preamble Scrambling Code: a scrambling code that is mapped to a particular PRACH on a one-to-one basis. The preamble and RACH data transmitted in a reverse direction for use of the PRACH are transmitted after being scrambled by the preamble scrambling code.

2. Signature Set: a set of Orthogonal Variable Spreading Factor (OVSF) codes with Spreading Factor (SF)=16 at which a maximum of 16 OVSF codes can be allocated per PRACH. The signature set is used for coding preamble and RACH data.

3. Access Slot Set: composed of 2 time slots, and the preamble transmission starts at a start point of each access slot.

FIG. 1 illustrates a RACH transmission method for initial system access in a 3$^{rd}$ Generation Partnership Project (3GPP) system.

In FIG. 1, blocks 101, 102 and 103 are a UE, a Node B, and a Radio Network Controller (RNC). The Node B (NB) manages cells, or a Base Station Transceiver (BTS) for directly participating in communication with the UE. The RNC controls multiple NBs and radio resources, respectively.

Referring to FIG. 1, in steps 111 and 112, the UE 101 and the NB 102 perform a PRACH procedure for RACH message transmission.

The UE 101 conducts a persistence value test using a persistence value mapped to a corresponding Access Service Class (ASC). The persistence value, a real value between 0 and 1, essentially represents a probability that the persistence value test will pass. For example, if the persistence value is 0.5, a success probability of the persistence value test is 50%. The UE 101, when it passes the persistence value test, transmits a preamble to the NB 102 in step 111. The UE 101 randomly selects one of the available signatures mapped to the ASC, encodes the preamble using the selected signature, sets initial power, and transmits the coded preamble at the set initial power. The setting of the initial power is disclosed in detail in 3GPP Technical Specification (TS) 25.331, so a detailed description thereof will be omitted herein.

In step 112, the NB 102 transmits an Acquisition Indication Channel (AICH) signal to the UE 101 in response to the preamble that the UE 101 transmitted in step 111. The AICH signal is used for reporting successful receipt of the preamble signal to the UE 101 that transmitted a particular signature, and also approving message transmission over a RACH.

FIG. 1 represents the case where the NB 102 has successfully received the preamble transmitted by the UE 101. Another PRACH procedure is described in detail in 3GPP TS 25.214, so a detailed description thereof will be omitted.

Upon receiving from the NB 102 an ACK for the preamble transmitted by the UE 101 in the PRACH procedure of steps 111 and 112, the UE 101 transmits an Radio Resource Control (RRC) CONNECTION REQUEST message using an RACH message in step 121. The RRC CONNECTION REQUEST message is a message over which the UE 101 sends a request for an RRC connection to the RNC 103.

After the RRC connection setup is completed, a Signaling Radio Bearer (SRB) can be set up between the UE 101 and the RNC 103, and the UE 101 reports its capability information to the network. The UE 101 can receive from the RNC 103 the basic information including temporary IDentity (ID) information to be used in the cell by the UE 101, like Cell-Radio Network Temporary Identity (C-RNTI). That is, the RRC CONNECTION REQUEST message of step 121 is a message over which the UE 101 sends a request for the RRC connection setup to the RNC 103. Here, unique ID information of the UE 101 can be included in the RRC CONNECTION REQUEST message. An RRC CONNECTION SETUP message of step 122 is a response message to the RRC CONNECTION REQUEST message, and over this message, the RNC 103 can assign, to the UE 101, an intra-cell temporary ID to be used in the cell by the UE 101, a scrambling code to be used by the UE 101, SRB configuration information, and the like. The temporary ID of the UE 101 refers to an ID of the UE 101, to be temporarily used in the cell, instead of a unique ID, or International Mobile Subscriber Id (IMSI), of the UE 101. The unique ID of the UE 101 is not used in a radio interface because of security issues or large size. Therefore, the temporary ID of the UE 101 assigned in the cell is used instead of the unique ID.

There are several possible temporary IDs of the UE 101, used in the cell. For example, there are HSDPA Radio Network Temporary Id (H-RNTI) used for High Speed Data Packet Access (HSDPA), E-DCH Radio Network Temporary Id (E-RNTI) used for Enhanced Uplink Dedicated CHannel (EUDCH), Cell-Radio Network Temporary Id (C-RNTI) used for signaling/data transmission of the UE 101 in the cell, and the like. The scrambling code of the UE 101, a unique code assigned to the UE 101 in a Code Division Multiplexing (CDM) system, is used as a code with which a network node can distinguish the UE 101 in uplink transmission.

An RRC CONNECTION SETUP COMPLETE message of step 123 is a confirmation message of the UE 101 for the RRC CONNECTION SETUP message, and through this message the UE 101 reports to the RNC 103 its available capability information that the RNC 103 can request.

The message transmission from steps 121 to 123 is a message flow for setting up the RRC connection, and shown in FIG. 1 is for an example where RRC connection is successfully set up.

FIG. 2 illustrates a collision occurring as more than two UEs select and transmit the same preamble in the PRACH procedure.

Referring to FIG. 2, because more than two UEs 201 have transmitted the same preamble in step 211, both receive an ACK for the transmitted preamble in step 212, and a collision may occur even in an RRC CONNECTION REQUEST message transmission process of step 221. If the RRC CONNECTION REQUEST message transmission fails due to the collision between the messaging of the UEs 201, an NB 202 does not transmit the RRC CONNECTION SETUP message corresponding to step 122 of FIG. 1. The UEs 201 activate a timer 222 from the time they transmit the RRC CONNECTION REQUEST message of step 221, and perform a new RACH procedure of step 231 upon a failure to receive the RRC CONNECTION SETUP message until a predetermined time t0 has elapsed. In this case, however, the UEs 201 may enter a new RACH procedure after waiting the predetermined time t0, causing a considerable delay in initial access.

SUMMARY OF THE INVENTION

An aspect of the present invention is to address at least the problems and/or disadvantages described above and to provide at least the advantages described below. Accordingly, an aspect of the present invention is to provide a method and apparatus for detecting a collision between UEs occurring in a RACH transmission process and reporting the detection to an Evolved Node B (E-NB), thereby reducing a delay.

According to one aspect of the present invention, there is provided a method for transmitting a Random Access Channel (RACH) signal by a User Equipment (UE) in a communication system. The method includes selecting a Contention Resolution (CR) channel allocated for collision detection; transmitting the selected CR channel and a connection request message to an Evolved Node B (E-NB), and receiving a response signal from the E-NB.

According to another aspect of the present invention, there is provided a method for receiving a Random Access Channel (RACH) signal from User Equipments (UEs) by an Evolved Node B (E-NB) in a communication system. The method includes receiving from each of the UEs a connection request message and a Contention Resolution (CR) channel allocated for collision detection; decoding the connection request message, and detecting a collision between the UEs using the CR channel; generating a positive/negative response signal for the connection request message according to the decoding result, and generating a collision indicator according to the collision detection result; and transmitting to the UEs at least one of the generated response signal, the generated collision indicator, and a unique identity (ID) of a corresponding UE.

According to further another aspect of the present invention, there is provided an apparatus for transmitting a Random Access Channel (RACH) signal to an Evolved Node B (E-NB) in a communication system. The apparatus includes a data channel generator for generating a signal transmitted over a data channel; a Contention Resolution (CR) channel generator for generating a signal transmitted over a CR channel allocated for collision detection; a CR channel selector for selecting one of the CR channel signals; and a multiplexer for multiplexing the generated data channel signal and the selected CR channel signal before transmission.

According to yet another aspect of the present invention, there is provided an apparatus for receiving a Random Access Channel (RACH) signal from User Equipments (UEs) in a communication system. The apparatus includes a demultiplexer for separating, from signals received from the UEs, a connection request message, a Contention Resolution (CR) channel signal allocated for collision detection, and a data channel signal; a collision detector for detecting a collision between the UEs from the CR channel signal, and outputting a signal indicating a collision; a data channel decoder for decoding the data channel signal; and a collision indicator generator for generating a collision indicator indicating a collision according to an output signal of the collision detector and success/failure in the decoding of the data channel decoder, and transmitting the collision indicator to the UEs.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a new RACH procedure and its associated channel, to thereby reduce a delay in acquiring an initial access. Although the present invention will be described herein with reference to a Long Term Evolution (LTE) system now under discussion in the 3GPP standard group, by way of example, the present invention is not limited to the 3GPP system.

The present invention provides a RACH transmission method, and also provides a CR channel generation method and a resource mapping method.

Figure 3:
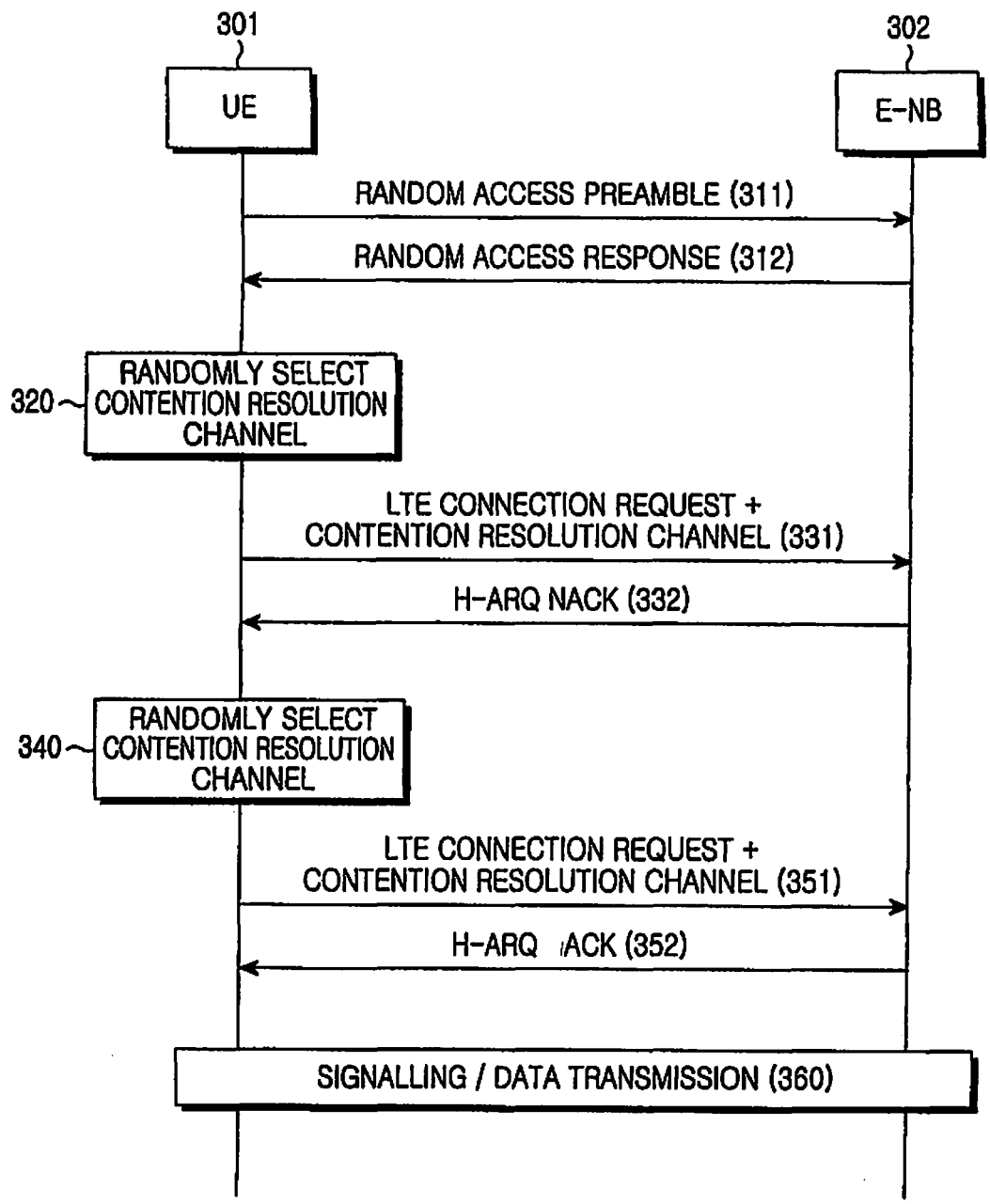
FIG. 3 is a diagram illustrating a RACH transmission process according to an embodiment of the present invention.

FIG. 3 illustrates a RACH transmission method proposed by the present invention.

Figure 1:
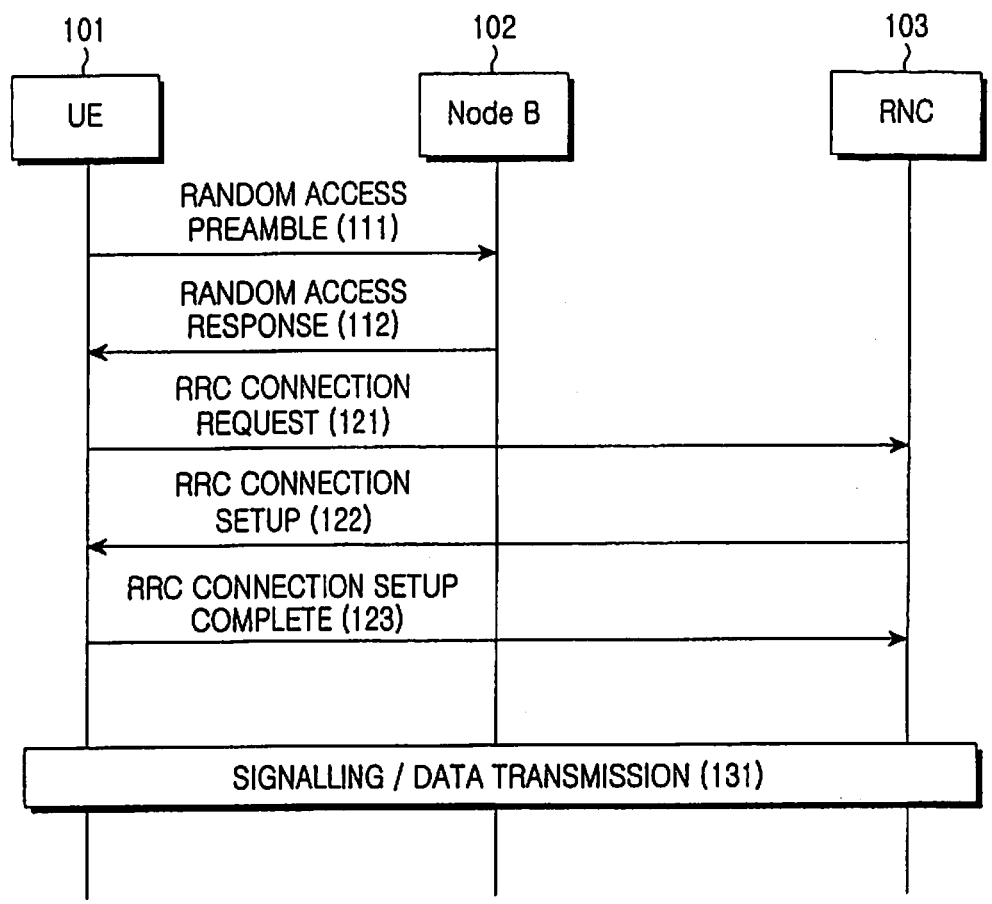
FIG. 1 is a diagram illustrating a RACH transmission process according to the conventional art.

Referring to FIG. 3, in the LTE system, the NB 102 and RNC 103 of FIG. 1 are merged into an Evolved Node B (E-NB) 302. A process of steps 311 and 312 is equal to the process of steps 111 and 112 of FIG. 1, and in this process, a UE 301 randomly selects a RACH preamble and transmits the selected RACH preamble using predetermined uplink resources, and the E-NB 302 transmits a RANDOM ACCESS RESPONSE message thereto. Upon receipt of the RANDOM ACCESS RESPONSE message to the transmitted preamble, the UE 301 transmits a CR channel and an LTE CONNECTION REQUEST message together in step 331. Multiple CR channels are generated to be orthogonal with each other. In step 320, the UE 301 randomly selects one CR channel. The LTE CONNECTION REQUEST message, similar to the RRC CONNECTION REQUEST message of step 121 in FIG. 1, includes unique ID information of the UE 301. It will be assumed herein that the present invention uses a Hybrid-ARQ (H-ARQ) technique as well during LTE CONNECTION REQUEST message transmission.

Upon failure to decode the LTE CONNECTION REQUEST message of step 331, the E-NB 302 transmits an H-ARQ NACK signal to the UE 301 in step 332. Upon receipt of the NACK signal, the UE 301 retransmits the LTE CONNECTION REQUEST message and the CR channel in step 351. In this case, the UE 301 randomly selects again a CR channel transmitted together with the LTE CONNECTION REQUEST message, in step 340. After the retransmission process of step 351, if the E-NB 302 has succeeded in the LTE CONNECTION REQUEST message decoding, the E-NB 302 transmits an H-ARQ ACK signal to the UE 301 in step 352, and starts data/signaling transmission in step 360.

Figure 4:
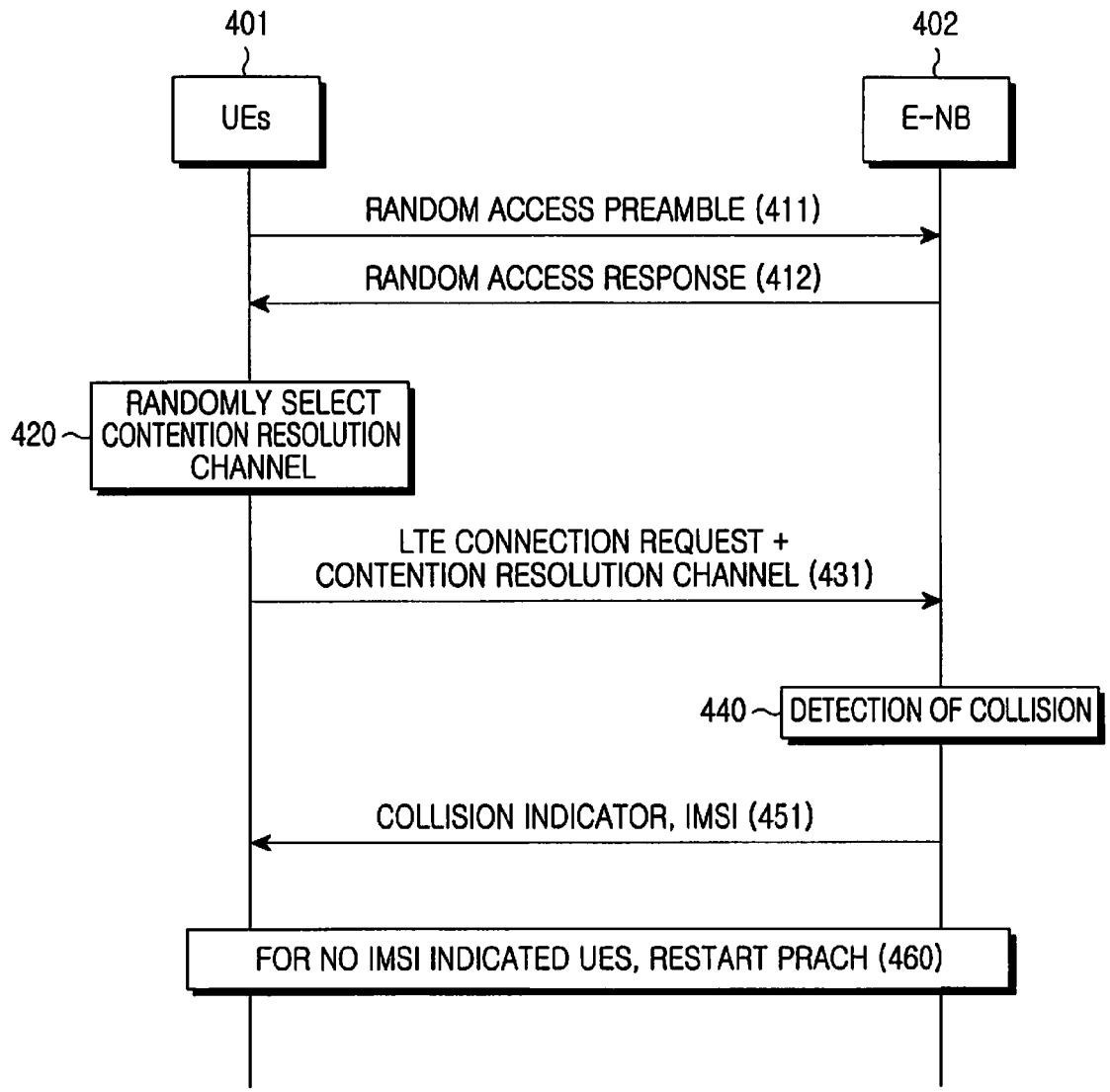
FIG. 4 is a diagram illustrating a RACH transmission process according to an embodiment of the present invention.

FIG. 4 illustrates an operation when a collision happens in the RACH transmission method, proposed in FIG. 3, according to an embodiment of the present invention.

Referring to FIG. 4, when more than two UEs 401 select and transmit the same preamble in step 411, the UEs 401 both receive a RANDOM ACCESS RESPONSE message to the corresponding preamble in step 412. Therefore, a collision may occur again when the UEs transmit an LTE CONNECTION REQUEST message in step 421. In the embodiment of the present invention, therefore, the UEs 401 randomly select a CR channel in step 420, and transmit the selected CR channel together with an LTE CONNECTION REQUEST message in step 431. In this manner, even though the UEs 401 undergo a collision in step 431, an E-NB 402 can detect the collision using the CR channel received from the UEs 401 in step 440. For example, when the UEs 401 each transmit a particular value only over their selected CR channel and transmit no signal over other CR channels, the E-NB 402 can determine that a collision has occurred if there are more than two CR channels from which a signal is detected through energy detection. Otherwise, when each CR channel is composed of an orthogonal sequence and a sequence of a randomly selected CR channel is transmitted, the E-NB 402 can determine that a collision has occurred if there are more than two sequences having a high correlation. A method for generating this CR channel will be described in detail below.

Figure 2:
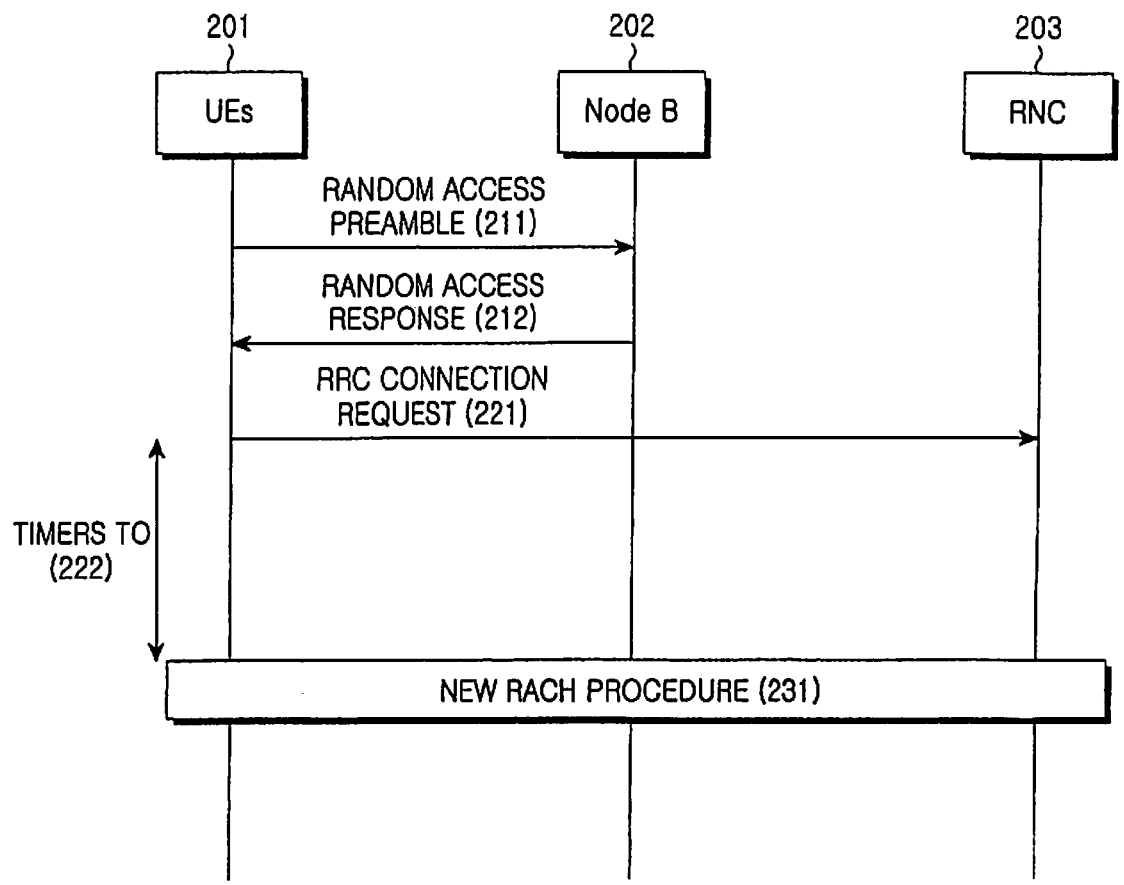
FIG. 2 is a diagram illustrating a RACH transmission process according to the conventional art.

Upon detecting a collision in step 440, the E-NB 402 transmits a COLLISION INDICATOR signal in step 451, and upon receipt of the COLLISION INDICATOR signal, the UEs 401 perform a new RACH procedure in step 460. According to an embodiment of the present invention, as the E-NB 402 detects a collision and indicates the detection with use of the CR channel, the corresponding UEs 401 can perform a new RACH procedure upon receipt of the COLLISION INDICATOR signal without the need for restarting the timer as done in step 222 of FIG. 2, or for waiting until the number of transmissions reaches the maximum number of H-ARQ transmissions, thereby contributing to a reduction in the delay required for the initial system access.

It is assumed herein that the present invention transmits the CR channel and the LTE CONNECTION REQUEST message with separate signals in steps 331, 351 and 431. In this case, even though the E-NB transmits a NACK signal without detecting a collision as more than two UEs that underwent the collision at initial transmission select the same CR channel, the UEs can randomly re-select a CR channel at every retransmission, thereby increasing a collision detection probability.

Because the LTE CONNECTION REQUEST message retransmits the same information, there is no problem in combining the retransmitted information with previously transmitted information. However, when the UEs send the CR channel and the message together as one signal, the UEs cannot re-select a CR channel for the combining of the LTE CONNECTION REQUEST message, causing a decrease in the collision detection probability.

However, even in the case where a collision occurs between more than two UEs, if the UEs are located in different E-NBs, a corresponding E-NB may succeed in detecting an LTE CONNECTION REQUEST signal for one of the UEs. For the signal detection-succeeded UE, there is no need to restart RACH transmission. Therefore, the E-NB transmits a collision indicator together with a unique ID, or International Mobile Subscriber Identity (IMSI), of the signal detection-succeeded UE in step 451, and allows in step 460 only the UEs except for the UE corresponding to the unique ID among the collided UEs to start new RACH transmission.

Figure 5:
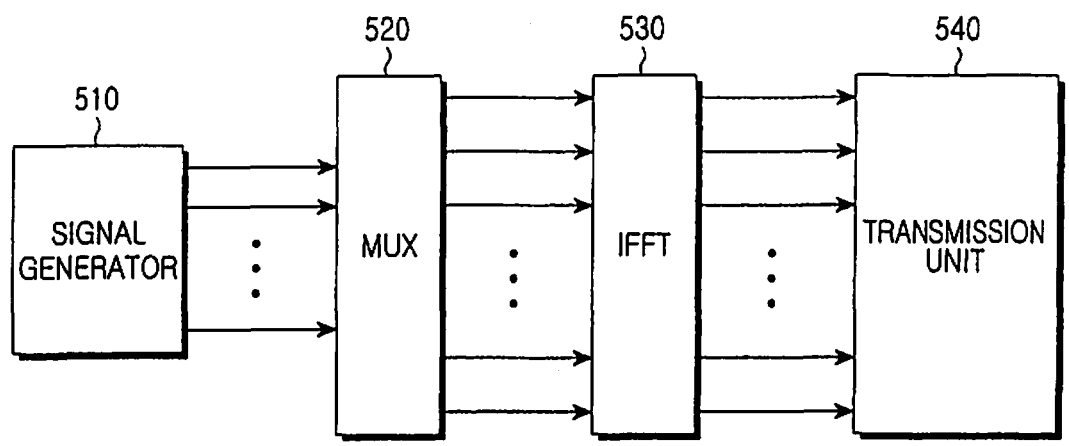
FIG. 5 is a block diagram illustrating a transmission apparatus according to an embodiment of the present invention.
Figure 6:
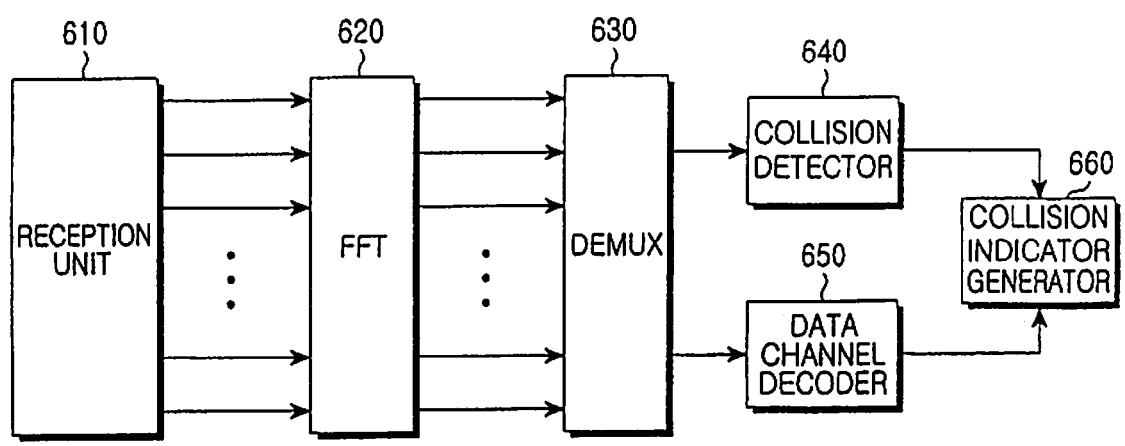
FIG. 6 is a block diagram illustrating a reception apparatus according to an embodiment of the present invention.

FIGS. 5 and 6 illustrate structures of a UE and an E-NB according to an embodiment of the present invention. In the following drawings and description of the present invention, a data channel is a channel used for transmitting an LTE CONNECTION REQUEST message.

Referring to FIG. 5, a signal generator 510 is a device for generating a signal transmitted over an LTE data channel and a CR channel, and an output signal of the signal generator 510 is input to a multiplexer 520. The signal input to the multiplexer 520 is mapped to allocated frequency resources, and then input to an IFFT device 530. The output signal of the IFFT device 530 is input to a transmission unit 540, and then transmitted over a channel after passing through a Radio Frequency (RF) device of a UE transmitter. The transmission unit 540 can include not only the RF device but also other devices such as a Cyclic Prefix (CP) adding device.

Referring to FIG. 6, a reception unit 610 can include an RF device and a CP removing device of an E-NB receiver. The output signal of the reception unit 610 is FFT-transformed in an FFT device 620, and then output to a demultiplexer 630. The demultiplexer 630 separates (demultiplexes) the transmitted CR channel and data channel (LTE CONNECTION REQUEST message), and transfers them to a collision detector 640 and a data channel decoder 650, respectively. The collision detector 640 detects a collision based on the CR channel, and the data channel decoder 650 decodes the LTE CONNECTION REQUEST message. The processing results of the collision detector 640 and the data channel decoder 650 are input to a collision indicator generator 660, and the collision indicator generator 660 generates a collision indicator based on the input results. The indicator is generated depending on a collision detection result in the collision detector 640. When the data channel decoder 650 has succeeded in decoding even though a collision has occurred, the E-NB transmits the indicator and a unique ID of the decoding-succeeded UE together.

Figure 7:
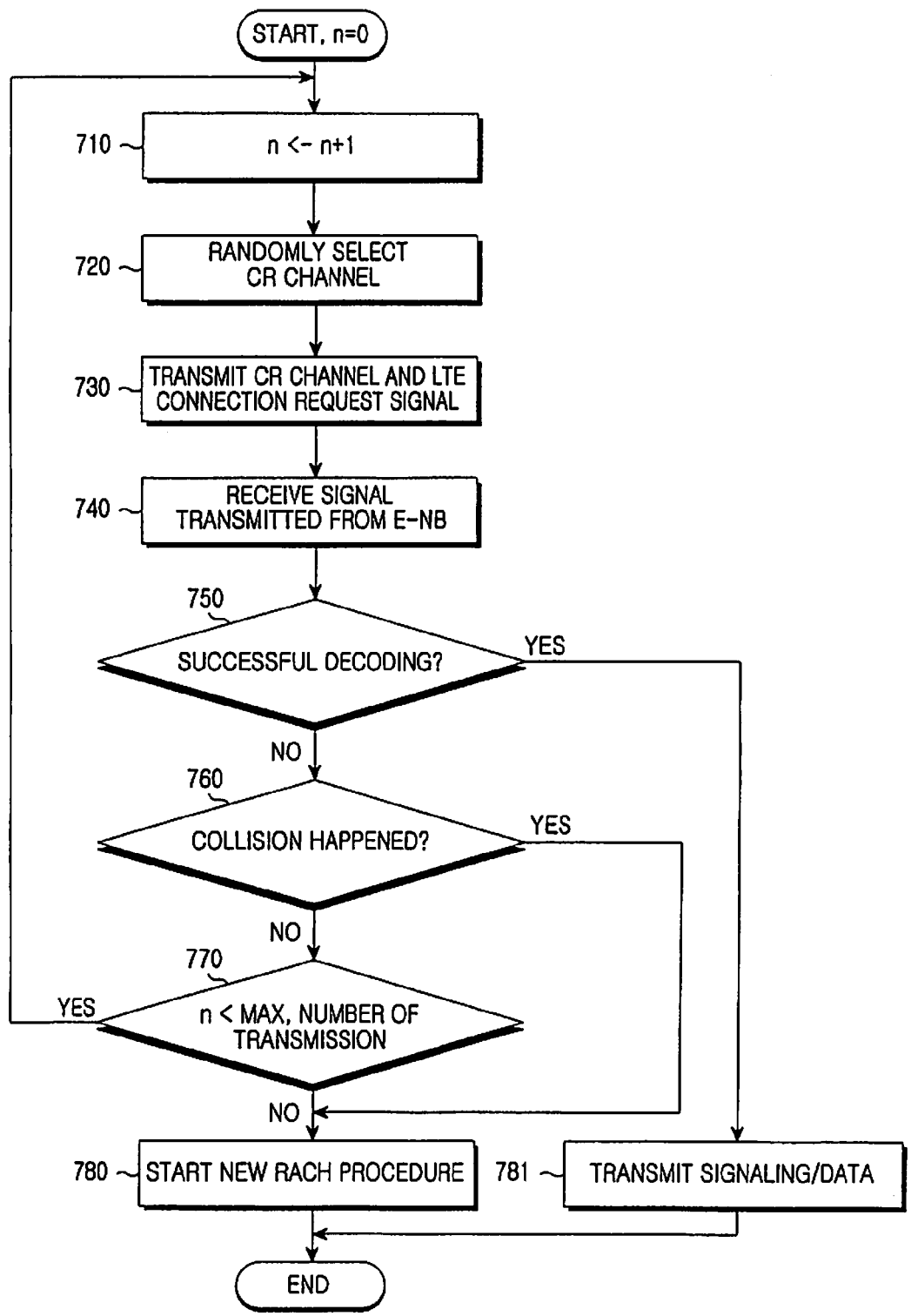
FIG. 7 is a diagram illustrating a transmission procedure according to an embodiment of the present invention.

FIG. 7 is a diagram illustrating a procedure of a UE according to an embodiment of the present invention.

Shown in FIG. 7 is a procedure after the UE receives a RANDOM ACCESS RESPONSE message. That is, step 700 of FIG. 7 starts after completion of step 312 of FIG. 3 or step 412 of FIG. 4.

Referring to FIG. 7, in step 700, the UE initializes a variable n to 0. Because the variable n initialized to 0 is the number of H-ARQ transmissions for an LTE CONNECTION REQUEST message, it increases by 1 each time every transmission starts, in step 710. The UE randomly selects a CR channel in step 720, and transmits the selected CR channel and the LTE CONNECTION REQUEST message in step 730. In step 740, the UE receives a response signal (including the ACK/NACK signal, collision indicator and unique ID information) transmitted from an E-NB. Using this signal, the UE determines in step 750 whether the E-NB has succeeded in decoding the LTE CONNECTION REQUEST message of the corresponding UE. If the E-NB has succeeded in the decoding, meaning that the initial system access is completed, the UE proceeds to step 781 where it starts signaling/data transmission. The case where the E-NB has succeeded in the decoding may also include a case where the E-NB transmits a collision indicator and unique ID information of a corresponding UE together as it has succeeded in decoding a LTE CONNECTION REQUEST message of the corresponding UE even though a collision has occurred.

However, if it is determined in step 750 that the E-NB has failed in decoding the LTE CONNECTION REQUEST message, the UE determines in step 760 whether a collision has occurred. If a collision has happened, the UE proceeds to step 780 where it starts a new RACH procedure. However, if no collision has occurred, the UE determines in step 770 whether the current number of transmissions has reached the maximum number of H-ARQ transmissions. If the current number of transmissions is less than the maximum number of H-ARQ transmissions, the UE returns back to step 710 and repeats steps 710 to 770. However, if the current number of transmissions is equal to the maximum number of H-ARQ transmissions, the UE proceeds to step 780 where it starts a new RACH procedure. That is, the UE starts the new RACH procedure in step 780, when a collision has occurred, or when the E-NB has failed in decoding the LTE CONNECTION REQUEST message until the current number of transmissions has reached the maximum number of H-ARQ transmissions even though no collision has occurred.

Figure 8:
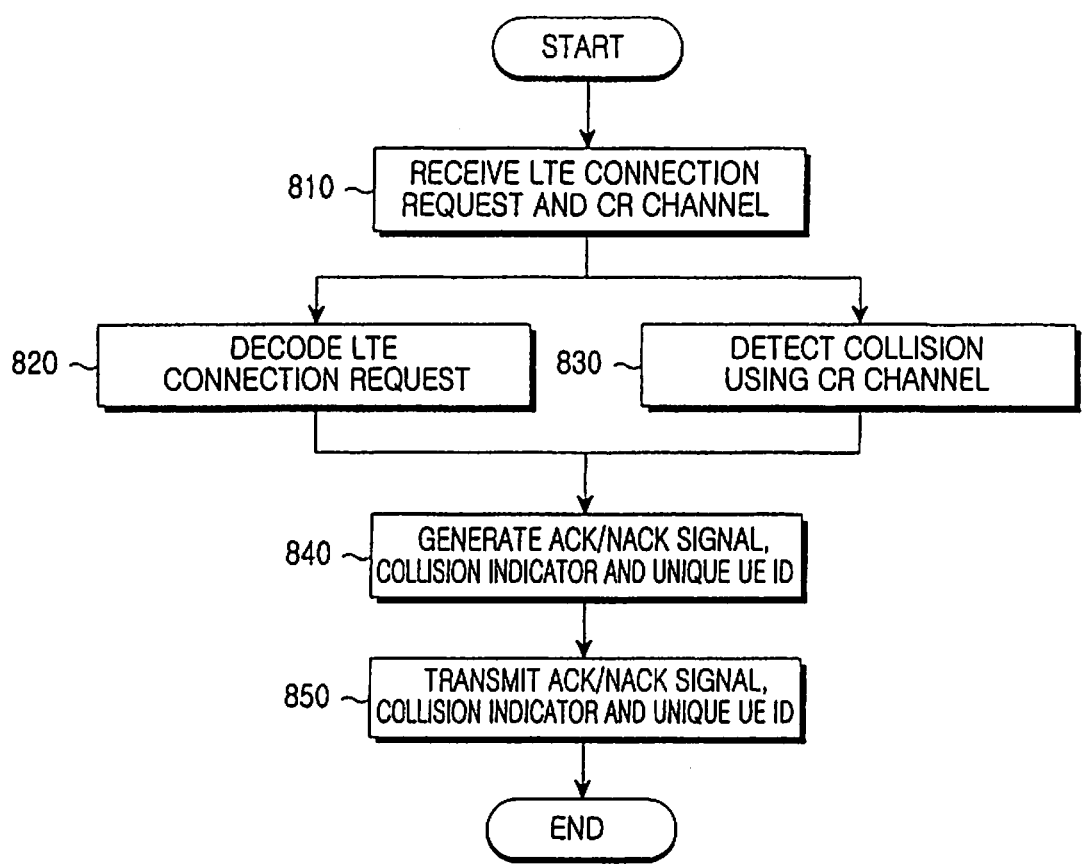
FIG. 8 is a diagram illustrating a reception procedure according to an embodiment of the present invention.

FIG. 8 is a diagram illustrating a procedure of an E-NB according to an embodiment of the present invention.

For convenience, in FIG. 8, the E-NB procedure will be described beginning from an operation of receiving an LTE CONNECTION REQUEST message and a CR channel from a UE. That is, the starting step 800 of FIG. 8 corresponds to the time that the transmission of a RANDOM ACCESS RESPONSE message to a RANDOM ACCESS PREAMBLE, shown in step 312 of FIG. 3 or step 412 of FIG. 4, was completed.

Referring to FIG. 8, the E-NB receives a LTE CONNECTION REQUEST message and a CR channel transmitted by a UE(s) in step 810. Thereafter, the E-NB decodes the LTE CONNECTION REQUEST message in step 820 and detects a collision using the CR channel in step 830. Steps 820 and 830 can be simultaneously performed by separate devices, or can be sequentially performed step by step regardless of the order. In step 840, the E-NB generates a ACK/NACK signal, collision indicator, a unique ID of the UE, etc. using the processing results of steps 820 and 830. In step 850, the E-NB transmits the signals generated in step 840.

A description will now be made of a new RACH procedure including CR channel transmission, collision detection, and collision indicator transmission, proposed by the present invention. Further, a description will be made herein of a method for generating a corresponding CR channel and embodiments for actually mapping the CR channel to physical resources. These embodiments of the present invention are based on FIGS. 9 to 12, and a detailed description of the signal generator 510 for a CR channel and a data channel has been made in FIG. 5. For convenience, the LTE CONNECTION REQUEST message is denoted herein as a data channel. In all embodiments, because the CR channel and the data channel are separately generated, they can be independently separated in the receiver. In the embodiments of the present invention, because it is assumed that a Single-Carrier Frequency Division Multiple Access (SC-FDMA) scheme, which is an uplink of the 3GPP LTE system, is used, an input end of an FFT device and an output end of an IFFT device can be considered as a time domain, and an interval between the FFT device and the IFFT device can be considered as a frequency domain in a transmitter of the SC-FDMA system.

Embodiment 1-1

Figure 9A:
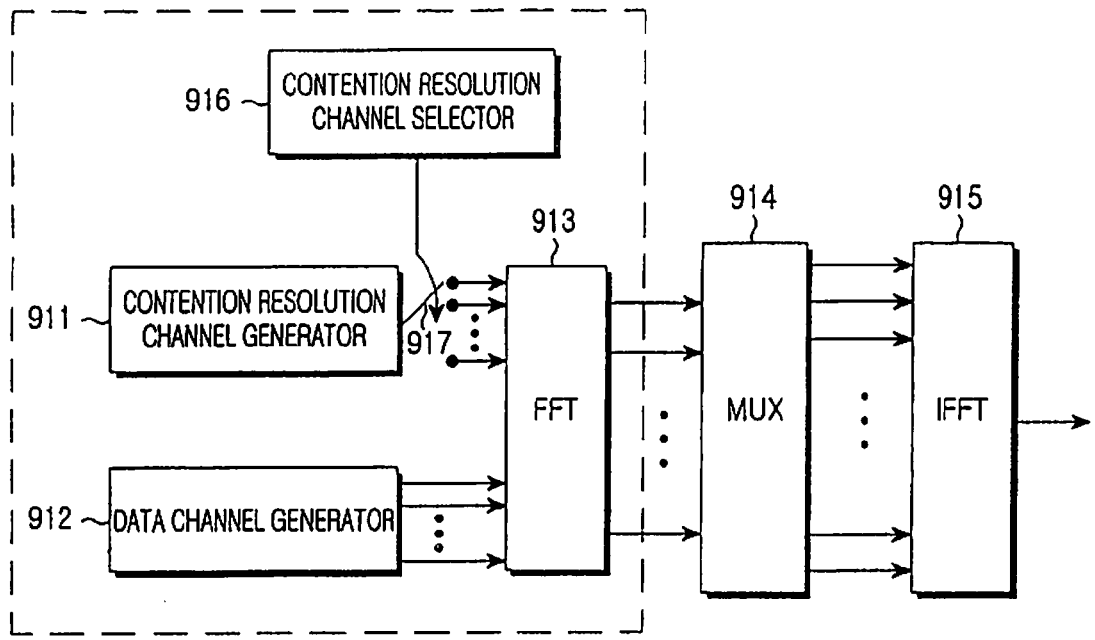
FIGS. 9A to 9C are diagrams illustrating a structure of a CR channel according to an embodiment of the present invention.

FIG. 9A is a diagram for a description of a CR channel generation method according to Embodiment 1-1 of the present invention.

Referring to FIG. 9A, a CR channel generator 911 and a data channel generator 912 generate a CR channel signal and a data channel signal, respectively, and a CR channel selector 916 randomly selects one of multiple CR channels. A CR channel generation method proposed by Embodiment 1-1 of the present invention transmits a signal only over the selected CR channel, and transmits no signal over the remaining CR channels (Discontinuous Transmission (DTX) signaling). This method is implemented by a switch 917. That is, a signal on the CR channel generated by the CR channel generator 911 is connected by the switch 917 to an input end of an FFT device 913, corresponding to a channel index selected by the CR channel selector 916, and no signal is input to input ends of the FFT device 913, corresponding to the remaining CR channels. Because the CR channel signal and the data channel signal are input to the same FFT device 913, it can be considered that they undergo Time Division Multiplexing (TDM) in the time domain before being transmitted. The output signal of the FFT device 913 is input to a multiplexer 914 where it is mapped to allocated frequency resources, and then output to an IFFT device 915. In FIG. 9A, blocks 911, 912, 913, 916 and 917 correspond to block 510 of FIG. 5.

Embodiment 1-2

Figure 9B:
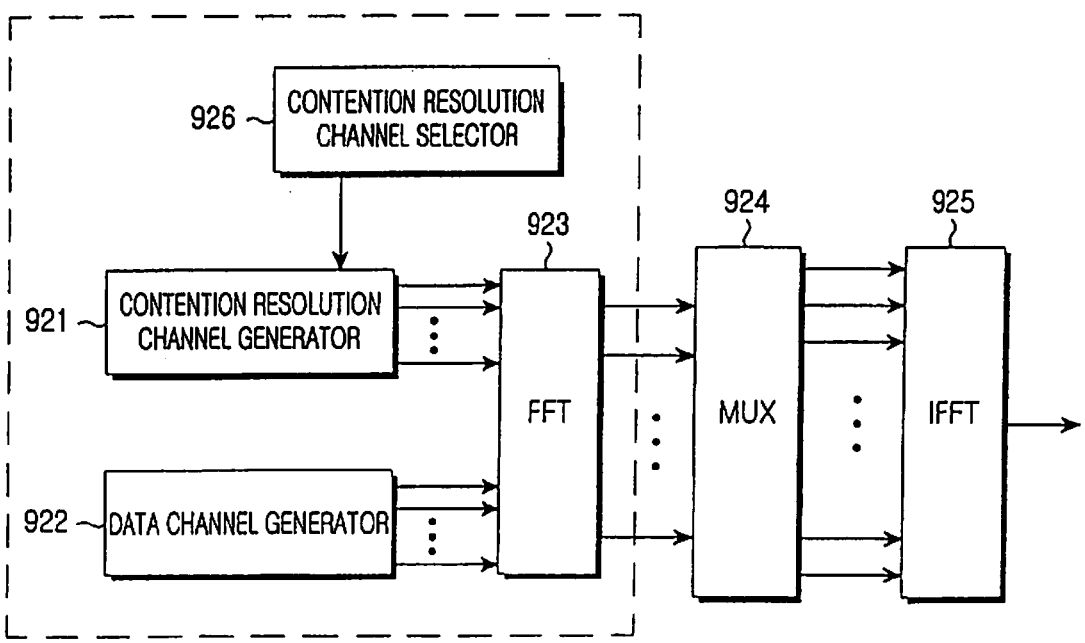

FIG. 9B is a diagram for a description of a CR channel generation method according to Embodiment 1-2 of the present invention.

Referring to FIG. 9B, Embodiment 1-2 of the present invention is similar to Embodiment 1-1 of the present invention in that a CR channel signal and a data channel signal are input to the same FFT device 923, and undergo TDM in the time domain. The difference in the CR channel generation method between the two embodiments is as follows. While a signal with a predetermined value is generated only in the selected CR channel and then connected to an input end of the corresponding FFT device before being transmitted in Embodiment 1-1 of the present invention, each CR channel is composed of an orthogonal sequence and an orthogonal sequence corresponding to the selected CR channel is transmitted in Embodiment 1-2 of the present invention. For example, a Walsh code can be used as the orthogonal sequence.

If a CR channel selector 926 randomly selects an index of a CR channel and inputs this value to a CR channel generator 921, the CR channel generator 921 generates an orthogonal sequence corresponding to the CR channel selected by the CR channel selector 926, and inputs the orthogonal sequence to a FFT device 923. A data channel signal generated by a data channel generator 922 is input to the FFT device 923. Devices 923, 924 and 925 are identical to the devices 913, 914 and 915 of FIG. 9A.

In both Embodiment 1-1 and Embodiment 1-2, in an SC-FDMA transmitter, the CR channel and the data channel are multiplexed in the time domain using the same FFT. In this case, the CR channel and the data channel are transmitted in the same time interval in one subframe.

Figure 9C:
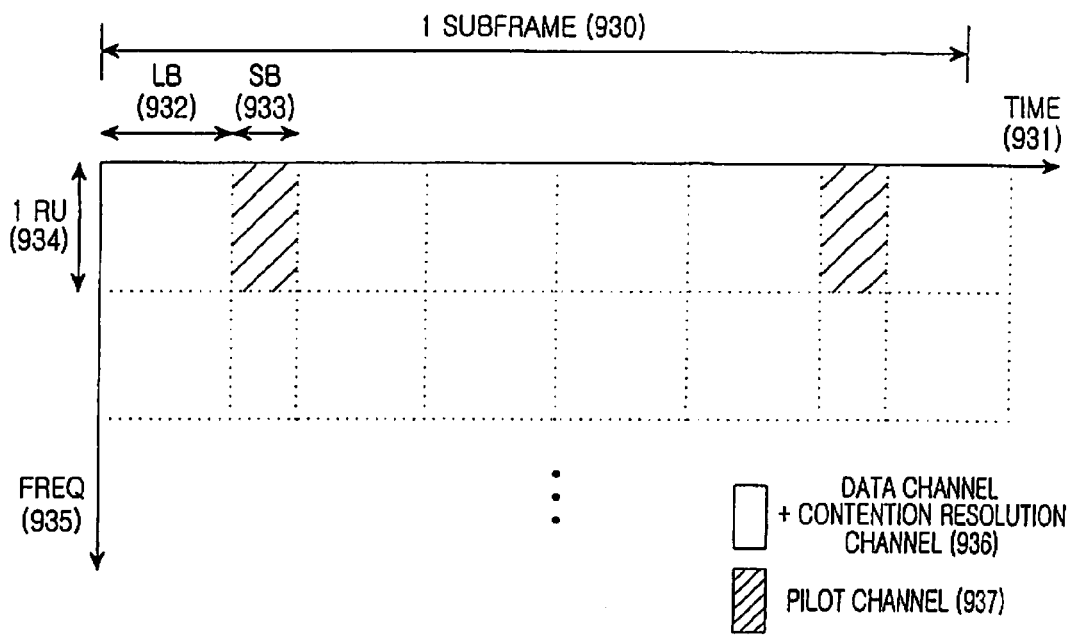

With reference to FIG. 9C, a description will now be made of an example where the signals are mapped to resources in the actual time-frequency domain. FIG. 9C can be applied to Embodiment 1-1 and Embodiment 1-2 of the present invention in the same manner.

In FIG. 9C, the horizontal axis 931 indicates time, the vertical axis 935 indicates frequency, reference numerals 930, 932 and 933 indicate 1 Subframe, Long Block (LB) and Short Block (SB), respectively, and reference numeral 934 indicates a Resource Unit (RU), or an allocation unit in the frequency domain. A data channel signal and a CR channel signal are always transmitted together over LBs 936, and a pilot channel signal is transmitted over an SB 937. The key point in FIG. 9C lies in that the CR channel and the data channel are multiplexed using the same FFT, so they are transmitted together in a time interval of SB or LB. A detailed example thereof is subject to change. For example, the number of and locations of the SBs, and a transmission point of the pilot channel are subject to change.

Embodiment 2-1

Figure 10A:
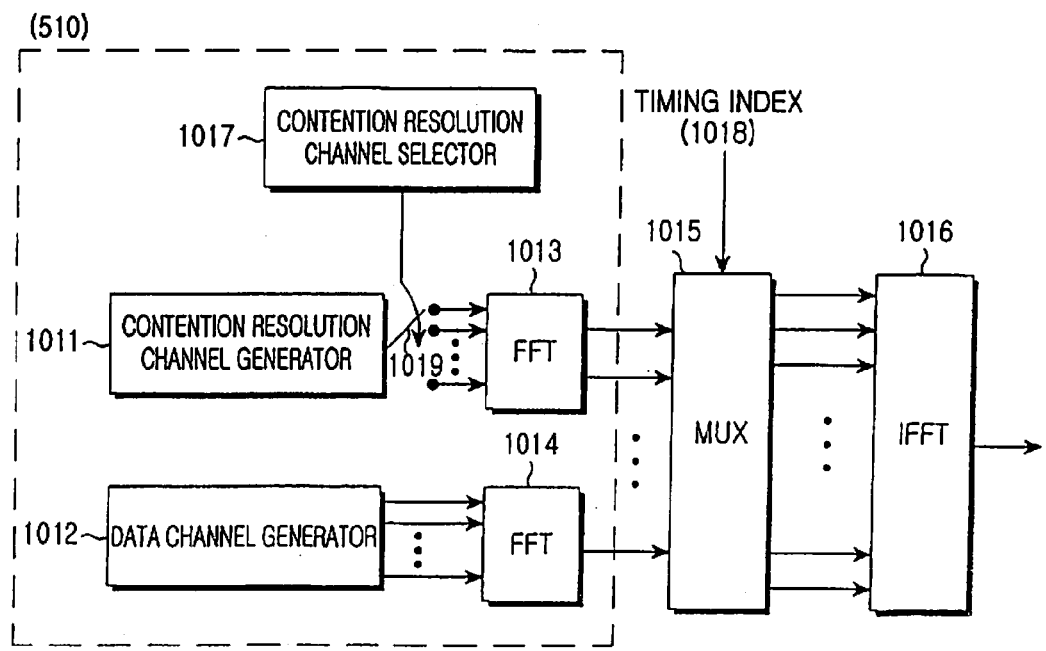
FIGS. 10A to 10C are diagrams illustrating a structure of a CR channel according to an embodiment of the present invention.

FIG. 10A is a diagram for a description of a CR channel generation method according to Embodiment 2-1 of the present invention.

Referring to FIG. 10A, a CR channel generator 1011 and a data channel generator 1012 generate a CR channel and a data channel, respectively, and a FFT device 1013 and an FFT device 1014 are FFT devices for the CR channel and the data channel, respectively. Embodiment 2-1 of the present invention different from Embodiment 1-1 in that the signals generated by the CR channel generator 1011 and the data channel generator 1012 are FFT-transformed by the separate FFT devices 1013 and 1014, respectively, and then input to a multiplexer 1015. Because the output signals of the two FFT devices 1013 and 1014 should be transmitted for different time intervals to maintain the SC-FDMA characteristic, a time index 1018 is input to the multiplexer 1015. The multiplexer 1015 selects one of the output signals of the FFT device 1013 and the FFT device 1014 according to the time index 1018, and outputs the selected signal to an IFFT device 1016. In the actual system, a single FFT device can be used instead of the FFT device 1013 and the FFT device 1014. In this case, the single FFT device can undergo time switching. The CR channel generation method, like that in Embodiment 1-1, transmits a predetermined signal only over the CR channel randomly selected by a CR channel selector 1017, and transmits no signal over the remaining CR channels (DTX signaling). That is, a signal on the CR channel generated by the CR channel generator 1011 is connected by a switch 1019 to an input end of an FFT device 1013, corresponding to a channel index selected by the CR channel selector 1017, and no signal is input to input ends of the FFT device 1013, corresponding to the remaining CR channels.

Embodiment 2-2

Figure 10B:
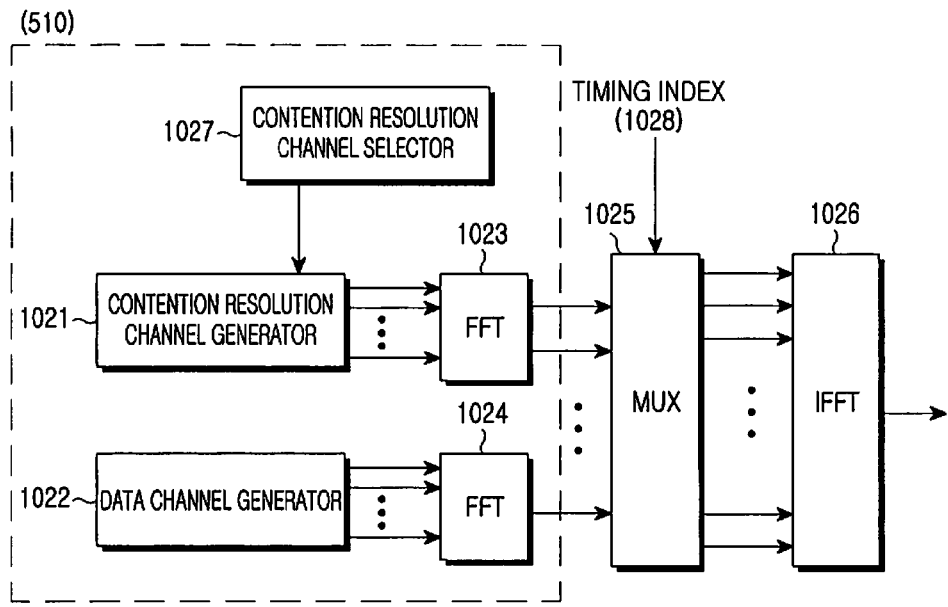

FIG. 10B is a diagram for a description of a CR channel generation method according to Embodiment 2-2 of the present invention.

Referring to FIG. 10B, in Embodiment 2-2 of the present invention, like in Embodiment 2-1, a CR channel signal generated by a CR channel generator 1021 and a data channel signal generated by a data channel generator 1022 are FFT-transformed by separate FFT device 1023 and FFT device 1024, respectively, and the output signals of the FFT device 1023 and the FFT device 1024 are transmitted for different time intervals to maintain the SC-FDMA characteristic. A multiplexer 1025 selects one of the output signals of the FFT device 1023 and the FFT device 1024 according to a time index 1028, and inputs the selected signal to an IFFT device 1026.

The CR channel generation method in Embodiment 2-2 of the present invention is similar to that in Embodiment 1-2. That is, if a CR channel selector 1027 randomly selects an index of a CR channel and inputs this value to the CR channel generator 1021, the CR channel generator 1021 generates an orthogonal sequence corresponding to the selected CR channel, and inputs the generated orthogonal sequence to the FFT device 1023. A data channel is generated by the data channel generator 1022 and then input to the FFT device 1024.

Figure 10C:
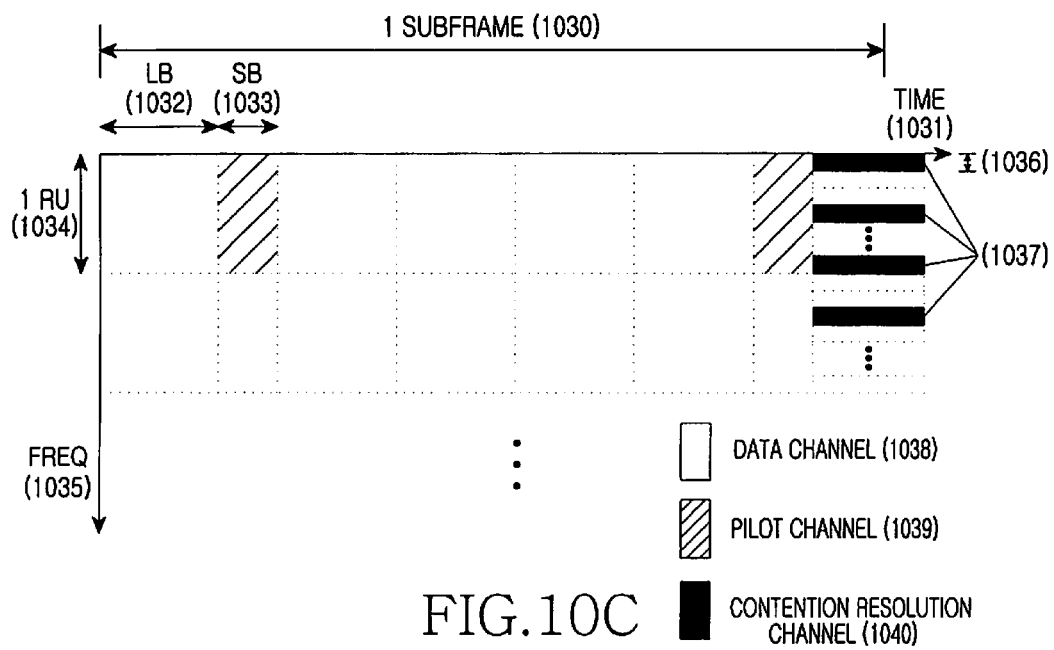

Embodiment 2-1 and Embodiment 2-2 are for the case where the CR channel and the data channel are transmitted for the different time intervals using different FFT devices. With reference to FIG. 10C, a description will now be made of an exemplary method in which the signals are mapped to resources in the actual time-frequency domain.

In FIG. 10C, the horizontal axis 1031 indicates time, the vertical axis 1035 indicates frequency, reference numerals 1030, 1032 and 1033 indicate 1 Subframe, LB and SB, respectively, and reference numerals 1034 and 1036 indicate RUs and subcarriers in the frequency domain. Reference numeral 1037 indicates a set of subcarriers used for transmission of the entire CR channel signal. The set of subcarriers 1037 can be composed of subcarriers located at regular intervals as shown in FIG. 10C, or can be composed of consecutive subcarriers. In Embodiment 2-1 and Embodiment 2-2, because the CR channel and the data channel use different FFT devices, they should be transmitted in the different time intervals to maintain the SC-FDMA characteristic. For example, in FIG. 10C, a data channel signal 1038 is transmitted with five LBs, a CR channel signal 1040 is transmitted in the last LB, and two SBs are used for transmission of a pilot channel signal 1039.

The foregoing embodiments show an example where multiple CR channels are generated and transmitted in the time domain, i.e. in input ends of the FFT device. Meanwhile, Embodiment 3 and Embodiment 4 of the present invention show an example in which CR channel signals are separated in the frequency domain. As described above, the data channel signal and the CR channel signal should be transmitted in different time intervals to maintain the SC-FDMA characteristic. The data channel signal, because it should be SC-FDMA-transmitted, is transmitted in the same method as that in Embodiments 1 and 2 of the present invention.

Embodiment 3

Figure 11A:
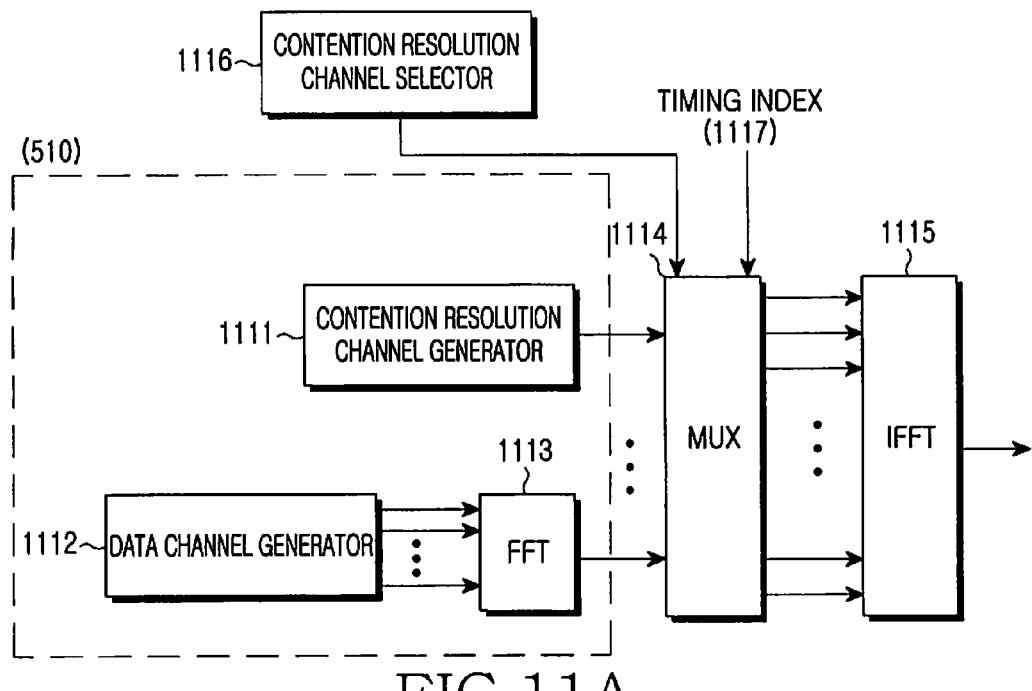
FIGS. 11A to 11B are diagrams illustrating a structure of a CR channel according to an embodiment of the present invention.

FIG. 11A is a diagram for a description of a CR channel generation method according to Embodiment 3 of the present invention.

Referring to FIG. 11A, a CR channel generator 1111 is a device for generating a CR channel signal, a data channel generator 1112 is a device for generating a data channel signal, and a FFT device 1113 is a device for FFT-modulating the data channel signal. The output signals of the CR channel generator 1111 and the FFT device 1113 are input to a multiplexer 1114. The multiplexer 1114 selects one of the output signals of the CR channel generator 1111 and the FFT device 1113 according to a time index 1117, and outputs the selected signal to an IFFT device 1115. At the time the CR channel signal is transmitted, the signal is transferred only to an input end of the IFFT device 1115, corresponding to a CR channel index randomly selected by a CR channel selector 1116, i.e.

only with the subcarrier, and no signal is transferred to input ends of the IFFT device 1115, corresponding to the remaining CR channels.

Figure 11B:
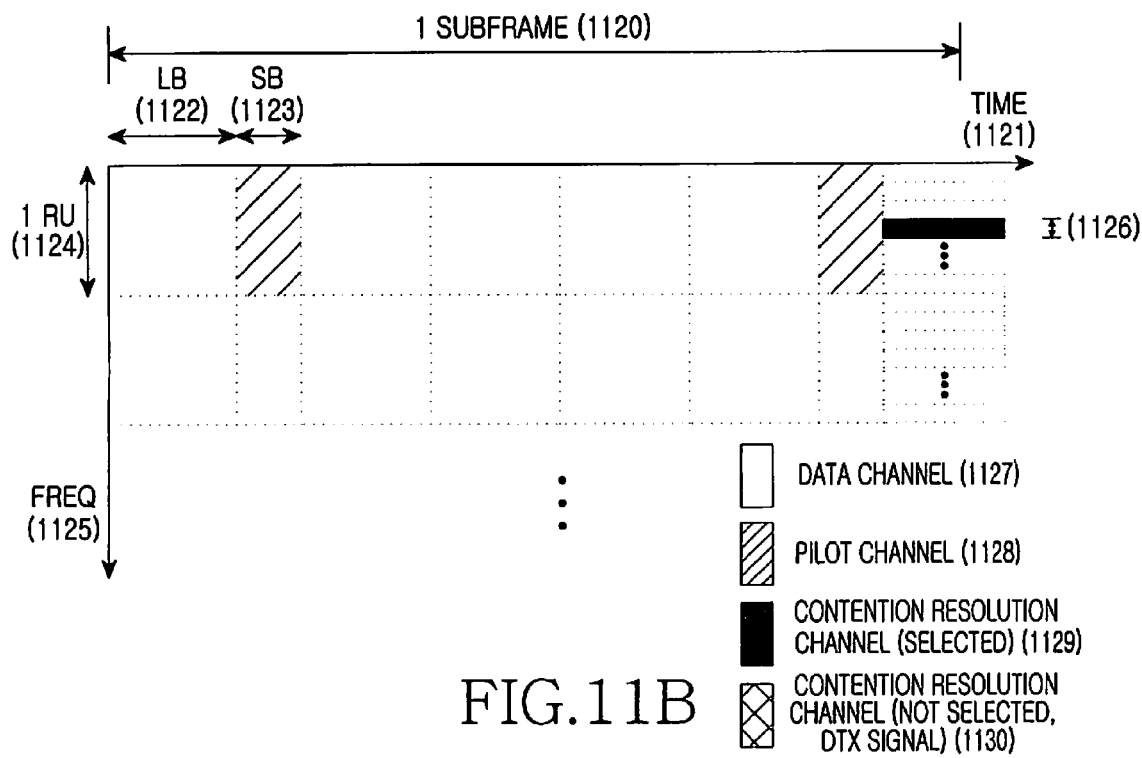

FIG. 11B illustrates a detailed resource mapping example for a CR channel signal according to Embodiment 3 of the present invention.

Referring to FIG. 11B, a data channel signal 1127 is transmitted in 5 LBs, a pilot channel signal 1128 is transmitted in 2 SBs, and CR channel signal 1129 and 1130 are transmitted in 1 LB. Subcarriers corresponding to each CR channel are defined in the frequency domain of the last LB. In this case, a signal is transmitted over the subcarrier corresponding to the selected CR channel signal 1129, and no signal is transmitted over the subcarriers corresponding to the unselected remaining CR channel signals 1130. An E-NB determines that a collision has occurred if a subcarrier set corresponding to the CR channel has more than two subcarriers where a signal is detected.

Embodiment 4

Figure 12A:
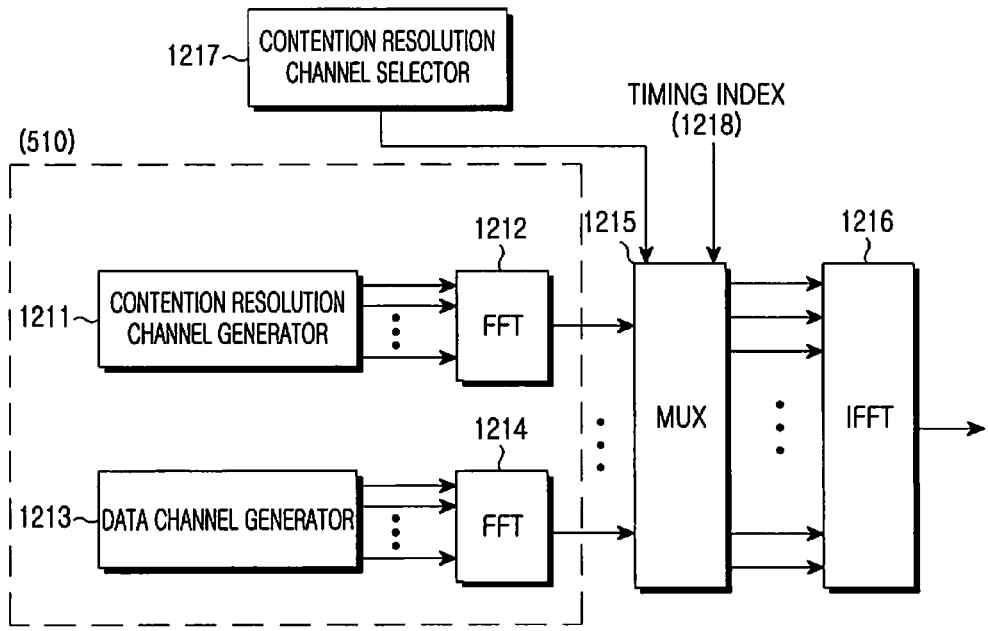
FIGS. 12A to 12B are diagrams illustrating a structure of a CR channel according to an embodiment of the present invention.

FIG. 12A is a diagram for a description of a CR channel generation method according to Embodiment 4 of the present invention.

In the case where Embodiment 4 transmits a CR channel signal using only one subcarrier like in Embodiment 3 of the present invention, it is not possible to normally detect a signal when a corresponding subcarrier is fading, and it is also not possible to guarantee reliable transmission due to a lack of energy. Therefore, Embodiment 4 of the present invention extends Embodiment 3 of the present invention to the case where one CR channel is defined as a subcarrier set composed of more than two subcarriers.

Referring to FIG. 12A, a CR channel generator 1211 is a device for generating a CR channel signal, and a data channel generator 1213 is a device for generating a data channel signal. An FFT device 1212 and an FFT device 1214 are devices for FFT-transforming the CR channel signal and the data channel signal, respectively. The output signals of the FFT device 1212 and the FFT device 1214 are input to a multiplexer 1215, and the multiplexer 1215 selects a signal according to a time index 1218 and outputs the selected signal to an IFFT device 1216. When a subcarrier set composed of multiple subcarriers means one CR channel, there is a need for the FFT device 1212 to satisfy the SC-FDMA characteristic. Actually, because the CR channel varies according to the way in which a subcarrier set for transmitting a signal is generated, it does not matter that the signal generated by the CR channel generator 1211 is common.

Figure 12B:
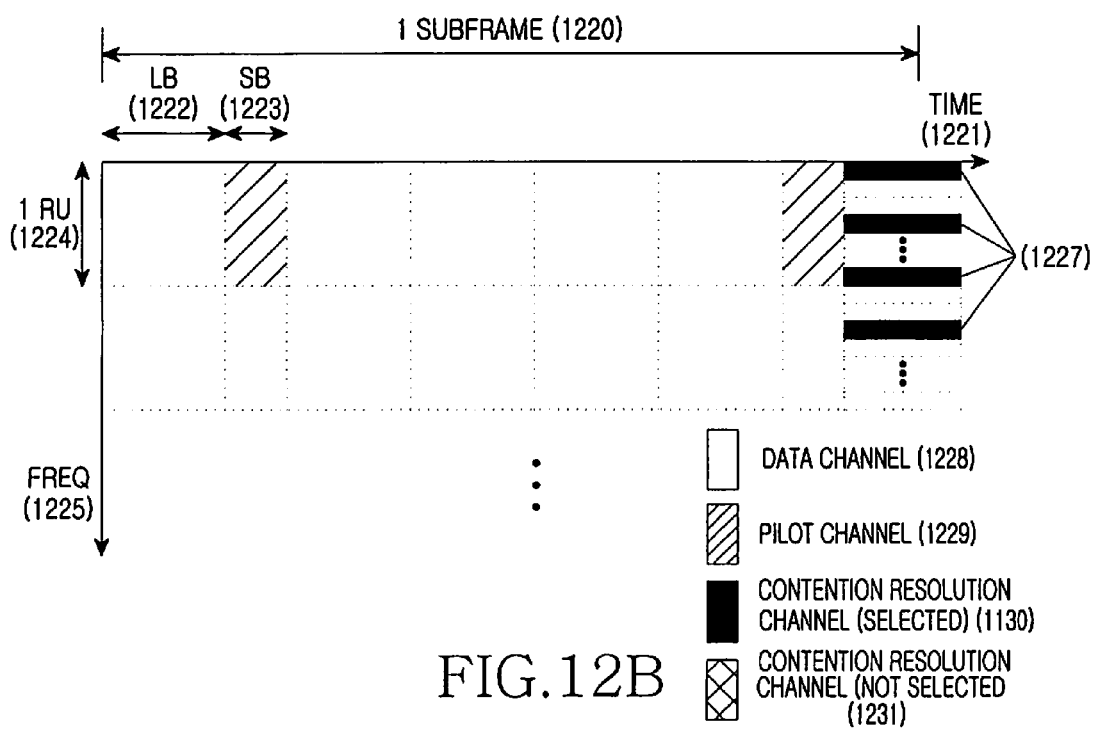

FIG. 12B illustrates a detailed resource mapping example for a CR channel signal according to Embodiment 4 of the present invention.

Referring to FIG. 12B, a data channel signal 1228 is transmitted in 5 LBs, a pilot channel signal 1229 is transmitted in 2 SBs, and CR channel signals 1230 and 1231 are transmitted in 1 LB. A subcarrier set corresponding to the CR channel signals 1230 and 1231 are defined in the last LB. In this case, the subcarrier set can be composed of consecutive subcarriers, or can be composed of subcarriers disposed at regular intervals. Here, the output signal of the FFT device 1212 is transmitted with the subcarrier set corresponding to the CR channel randomly selected by a CR channel selector 1217, and no signal is transmitted with subcarrier sets corresponding to the remaining unselected CR channels. While Embodiments 1-1, 1-2, 2-1 and 2-2 of the present invention allow the E-NB to detect a collision using a CR channel in the time domain, Embodiments 3 and 4 of the present invention detects a collision in the frequency domain.

The present invention provides a technique for reducing a delay by transmitting a CR channel during the LTE CONNECTION REQUEST message transmission, and also provides a method for generating the CR channel. Therefore, the RACH procedure not directly related to the present invention can be modified. For example, the present invention can be applied regardless of the transmission method of RANDOM preamble/RESPONSE in steps 311 and 312 of FIG. 3, and use/nonuse of H-ARQ and a temporary ID allocation method in step 331.

As is apparent from the foregoing description, according to the present invention, when a CR channel is transmitted together with an LTE CONNECTION REQUEST message in RACH transmission, the E-NB can detect an occurrence of a collision. Thus, upon detecting a collision, the E-NB can indicate the detection to allow the UE to start a new RACH procedure, thereby reducing the delay.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a Random Access Channel (RACH) signal by a User Equipment (UE) in a communication system, the method comprising:
    selecting a Contention Resolution (CR) channel signal from a plurality of CR channel signals allocated for collision detection;
    transmitting the selected CR channel signal and a connection request message to an Evolved Node B (E-NB);
    receiving a response signal from the E-NB;
    restarting a RACH procedure, if the collision indicator is included in the response signal and a unique identity (ID) of the UE is not included in the response signal; and
    transmitting signalling or data to the E-NB, if the collision indicator and the unique ID of the UE are included in the response signal.

2. The method of claim 1, wherein the plurality of CR channel signals include orthogonal sequences, and
    wherein transmitting the selected CR channel signal to the E-NB comprises:
    transmitting an orthogonal sequence corresponding to the selected CR channel signal from among the orthogonal sequences of the plurality of CR channel signals.

3. The method of claim 1, further comprising:
    returning to the selecting of a CR channel, if the response signal includes a Negative Acknowledgement (NACK) signal.

4. A method for receiving a Random Access Channel (RACH) signal from User Equipments (UEs) by an Evolved Node B (E-NB) in a communication system, the method comprising:
    receiving, from each of the UEs, a connection request message and a Contention Resolution (CR) channel signal allocated for collision detection;
    decoding the connection request message, and detecting a collision between the UEs using the CR channel signals;
    generating a response signal including a collision indicator according to the collision detection result;
    adding a unique identity (ID) of a signal detection-succeeded UE to the response signal, if the decoding of the connection request message is successful; and
    transmitting the response signal to the UEs.

5. The method of claim 4, wherein detecting whether the collision occurs comprises:

detecting energy of a CR channel signal, and determining that a collision has occurred when there are more than two signals whose energy is greater than a threshold.

6. The method of claim 4, wherein detecting the collision comprises:
determining that a collision has occurred when there are more than two CR channel signals, a correlation between which is greater than a threshold.

7. An apparatus for transmitting a Random Access Channel (RACH) signal to an Evolved Node B (E-NB) in a communication system, the apparatus comprising:
a data channel generator for generating a signal transmitted over a data channel;
a Contention Resolution (CR) channel generator for generating a signal transmitted over a CR channel allocated for collision detection;
a CR channel selector for selecting one of the CR channel signals;
a multiplexer for multiplexing the generated data channel signal and the selected CR channel signal before transmission; and
a controller for restarting a RACH procedure, if a collision indicator is included in a response signal and a unique identity (ID) of the UE is not included in the response signal, and for transmitting signalling or data to the E-NB, if the collision indicator and the unique ID of the UE are included in the response signal.

8. The apparatus of claim 7, wherein the multiplexer transmits the data channel signal and the CR channel signal in different time intervals.

9. The apparatus of claim 7, wherein the multiplexer transmits the CR channel signal in more than two subcarriers in a distributed manner.

10. An apparatus for receiving a Random Access Channel (RACH) signal from User Equipments (UEs) in a communication system, the apparatus comprising:
a demultiplexer for separating, from signals received from the UEs, a connection request message, a Contention Resolution (CR) channel signal allocated for collision detection, and a data channel signal;
a collision detector for detecting a collision between the UEs from the CR channel signal, and outputting a signal indicating an occurrence of a collision;
a data channel decoder for decoding the data channel signal; and
a collision indicator generator for generating a response signal including a collision indicator indicating the occurrence of the collision according to the signal of the collision detector, and for adding a unique identity (ID) of a signal detection-succeeded UE to the response signal, if the decoding of the data channel decoder is successful, and transmitting the response signal to the UEs.

11. The apparatus of claim 10, wherein the collision detector detects energy of a CR channel signal, and determines that a collision has occurred when there are more than two signals whose energy is greater than a threshold.

12. The apparatus of claim 10, wherein the collision detector determines that a collision has occurred when there are more than two CR channel signals, a correlation between which is greater than a threshold.

13. The apparatus of claim 7, wherein the selected CR channel signal includes an orthogonal sequence.

* * * * *